United States Patent
Hediger et al.

(10) Patent No.: US 6,965,184 B2
(45) Date of Patent: Nov. 15, 2005

(54) APPARATUS FOR SUPPORTING A STATOR END WINDING

(75) Inventors: Daniel Hediger, Othmarsingen (CH); Hrvoje Lukacic, Birr (CH); Duncan Madle, Belfort (FR); Francesco Stallone, Locarno (CH); Alfred Ziegler, Ennetbaden (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 10/883,726

(22) Filed: Jul. 6, 2004

(65) Prior Publication Data

US 2005/0029898 A1 Feb. 10, 2005

(30) Foreign Application Priority Data

Jul. 5, 2003 (DE) .......................................... 103 30 523

(51) Int. Cl.⁷ ................................................ H02K 3/50
(52) U.S. Cl. ..................................................... 310/260
(58) Field of Search ................................ 310/194, 260, 310/270

(56) References Cited

U.S. PATENT DOCUMENTS

| | | | |
|---|---|---|---|
| 4,488,079 A | 12/1984 | Dailey et al. | 310/260 |
| 4,501,985 A | 2/1985 | Dobson et al. | 310/270 |
| 4,752,708 A * | 6/1988 | Jager et al. | 310/260 |
| 5,355,046 A * | 10/1994 | Weigelt | 310/260 |
| 5,485,050 A * | 1/1996 | Zimmermann | 310/260 |
| 5,734,220 A | 3/1998 | Rowe et al. | 310/260 |
| 5,798,595 A | 8/1998 | Nilsson et al. | 310/260 |
| 5,969,460 A * | 10/1999 | de Pietro et al. | 310/270 |
| 6,836,052 B2 * | 12/2004 | Stallone et al. | 310/260 |

FOREIGN PATENT DOCUMENTS

| | | | |
|---|---|---|---|
| DE | 1 208 000 | 12/1965 | |
| DE | 40 24 395 | 3/1991 | |
| EP | 0 926 802 A2 | 6/1999 | ............ H02K/3/50 |

OTHER PUBLICATIONS

Search Report from DE 103 30 523.8 (May 10, 2004).

* cited by examiner

Primary Examiner—Burton Mullins
(74) Attorney, Agent, or Firm—Cermak & Kenealy, LLP; Adam J. Cermak

(57) ABSTRACT

An apparatus (10) for supporting a winding (7) on a stator (1), in particular on a generator stator in a power station. The winding (7) has an end winding (9) which is supported axially on the core (2) of the stator (1) via winding supports (11) of the supporting apparatus (10). The winding supports (11) are supported on the end winding (9) via a stressing device (22), at right angles to an envelope surface (21). In order to improve the axial position between the winding support (11) and the end winding (9) during operation of the stator (1), a coupling device (23) is provided which allows relative movements between the end winding (9) and the winding support (11) in the circumferential direction and at right angles to the envelope surface (21), and prevents such relative movements in an envelope line direction (30).

15 Claims, 2 Drawing Sheets

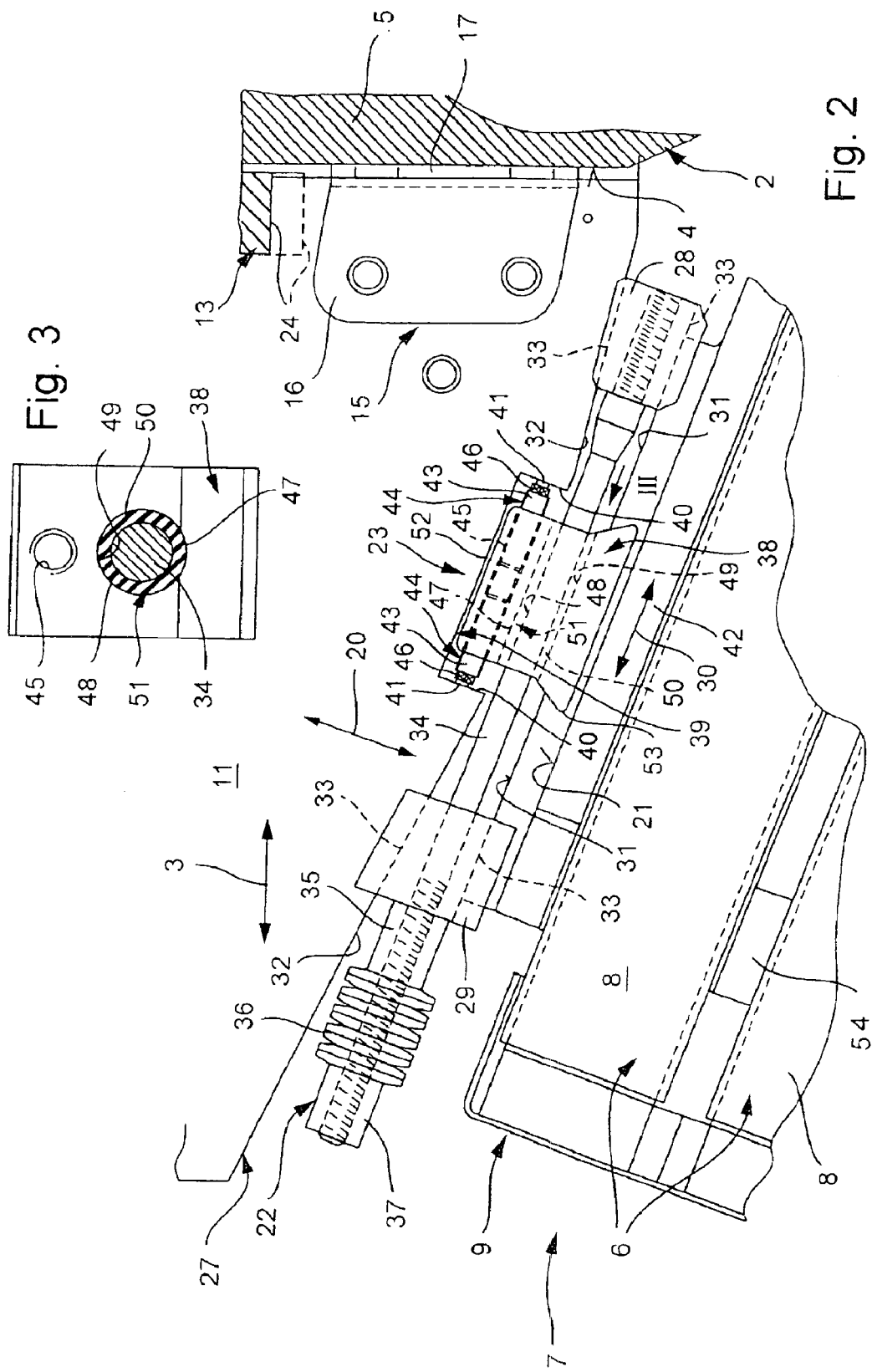

APPARATUS FOR SUPPORTING A STATOR END WINDING

This application claims priority under 35 U.S.C. §119 to German application no. 103 30 523.8, filed Jul. 5, 2003, the entirety of which is incorporated by reference herein.

BACKGROUND OF THE INVENTION

1. Field of the Invention

The present invention relates to an apparatus for supporting a winding on a stator, in particular on a generator stator in a power station.

2. Brief Description of the Related Art

Normally, a stator, in particular a generator stator in a power station, has a core as well as a winding which has two or more winding bars. The ends of these winding bars are passed out of the core at at least one axial end face of the core of the stator, and are thus bent around and connected to one another such that they form an end winding on the end face of the core, which widens in the form of a funnel or in the form of a cone as the distance from the core increases. For operation of the stator, this end winding must be supported in the axial direction of the stator, that is to say axially, with tensile stress being applied to the core. Furthermore, the end winding must be loaded radially from the outside to the inside by means of prestressing. This stressing or support of the end winding is necessary in order to make it possible to absorb the electrodynamic forces which occur during operation. In some cases, the desired bracing of the winding and of the end winding is applied even during the manufacture of the stator. However, seating processes and the like may occur during operation of the stator which may have a disadvantageous effect on the stress acting on the winding and on the end winding.

U.S. Pat. No. 5,798,595 discloses a supporting apparatus in which the end winding is braced and is radially supported with the aid of supporting rings. The supporting rings in this case extend in the circumferential direction and surround the outer face of the end winding. The end winding is in this case supported on the outside of these supporting rings at right angles to its envelope surface. These supporting rings allow a predetermined prestress to be applied to the end winding during the manufacture of the stator winding. However, this stress may decrease as a result of seating processes. In the case of the known supporting apparatus, the winding supports each have an associated damping device which operates with compression springs that are arranged between the respective winding support and the supporting rings. This results in a sprung bearing for the supporting rings on the winding supports. At the same time, the compression springs can produce axial bracing for the winding. However, the compression springs cannot provide additional radial bracing, or bracing at right angles to the envelope surface, of the end winding, since the supporting rings absorb the spring forces in this direction.

U.S. Pat. No. 4,488,079 discloses a further supporting apparatus for an end winding, in which the end winding is stiffened with the aid of bracing plates, which are arranged radially on the outside of the end winding. The winding supports are then supported radially and at right angles to the envelope surface on the bracing plates of the end winding.

SUMMARY OF THE INVENTION

The invention is intended to overcome this problem. The invention relates to the problem of specifying an improved embodiment for supporting a stator winding or an end winding, which can maintain the desired stress or supporting effect better particularly during varying operating conditions.

In the case of the supporting apparatus according to the invention, the stressing devices which are associated with the winding supports may introduce the desired prestressing into the end winding such that it is distributed around the circumference. The stressing devices may in this case be designed, for example with the aid of spring devices, directly such that they can compensate to a greater or lesser extent for seating processes or the like in the end winding, so that the desired bracing can essentially always be ensured even in changing conditions.

The coupling device proposed according to the invention prevents relative movements between the end winding and the supporting apparatus or the respective winding support in an envelope line direction of the end winding, and in the process ensures that the winding supports are always in the same relative position with respect to the end winding, in terms of the envelope line direction. This is advantageous for introducing optimum supporting forces into the end winding. Furthermore, this positive coupling is particularly important for situations where the end winding is moving toward the core of the stator, as is the case, for example, while the stator winding is cooling down. During a movement such as this, the positive coupling via the at least one coupling device means that the winding supports and the supporting apparatus are likewise moved back against the end face of the core. In this case, it has been found that it is particularly important for correct operation of the supporting apparatus that the coupling device allows relative movements between the end winding and the respective winding support in the circumferential direction of the end winding as well as at right angles to the envelope surface of the end winding. This allows the end winding to twist or expand at right angles to the envelope surface without being impeded by the coupling devices. This avoids undesirable stresses between the winding supports and the end winding in the area of the coupling devices.

In one particularly advantageous development, the coupling device may have a coupling body which is arranged fixed on the end winding, as well as a cut out which is formed on the respective winding support, and is bounded in the envelope line direction by two planar guide surfaces, which face one another and extend parallel to one another in the circumferential direction and at right angles to the envelope surface. In this case, the coupling body projects at right angles to the envelope surface into the cut out, and is supported by supporting zones in the envelope line direction on the guide surfaces. This configuration deliberately results in two degrees of freedom between the end winding and the respective winding support specifically for relative movements at right angles to the envelope surface and in the circumferential direction. In contrast to this, relative movements in the envelope line direction are prevented by the supporting surfaces which rest on the guide surfaces, that is to say by means of an interlock. The degrees of movement freedom between the end winding and the respective winding support are thus defined or predetermined exactly in the desired manner.

In one development, the stressing device may have a wedge close to the core as well as a wedge remote from the core, which are mounted on the end winding and on the respective winding support such that they can move in the envelope line direction and which are braced with respect to one another by means of a tie rod, driving the respective winding support and the end winding away from one another at right angles to the envelope surface. A stressing device such as this results in the forces which are transmitted by means of the tie rod and are produced, for example, by means of a compression spring device being converted via the wedges into supporting forces, and amplified in the process, dependent on the wedge shape. This results on the one hand in a spring support which, on the other hand acts essentially in only one direction, specifically at right angles to the envelope surface, via the expediently guided wedges. In this development, the coupling body expediently contains a through-opening, which extends in the envelope line direction and through which the tie rod extends. This results on the one hand in the tie rod having a dual function, since it secures the coupling body on the end winding in an interlocking manner. Furthermore, this measure allows a particularly space-saving, compact construction. Assuming that it is appropriately supported in the radial direction, the end winding can be braced radially and axially, and in the envelope direction, with the aid of the stressing devices.

The abovementioned configuration is used in one development such that the outer face of the tie rod is supported via a damping material on an inner face of the through-opening, in which case the through-opening may contain, in particular, a tube composed of the damping material, through which the tie rod extends. The proposed, damped support for the tie rod on the coupling body results in intensive oscillation damping for the tie rod during operation of the stator, thus increasing the fatigue life of the respective stressing device, and at the same time "smoothing" high-frequency disturbances that are superimposed on the supporting forces produced by the stressing device as a result of the vibration of the tie rod.

Further important features and advantages of the invention can be found in the drawings and in the associated description of the figures with reference to the drawings.

BRIEF DESCRIPTION OF THE DRAWINGS

Preferred exemplary embodiments of the invention are illustrated in the drawings and will be explained in more detail in the following description, with the same reference symbols relating to the same, similar or functionally identical components. In the figures, in each case schematically:

FIG. 2 shows a view as in FIG. 1, but illustrated enlarged, FIG. 3 shows a side view of a coupling body.

DETAILED DESCRIPTION OF THE PREFERRED EMBODIMENTS

Figure 1:
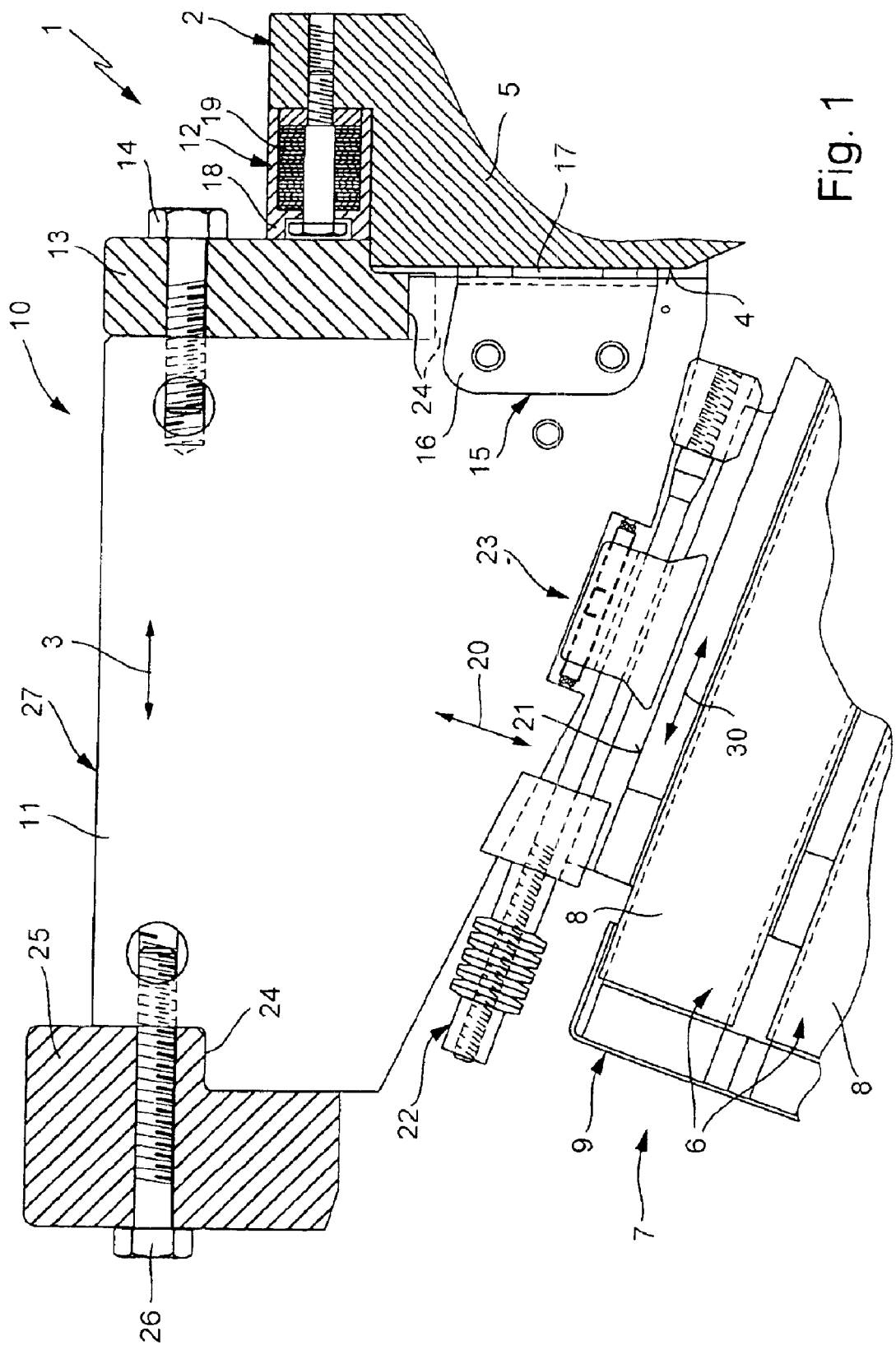
FIG. 1 shows a simplified axial section through a stator in the area of a supporting apparatus according to the invention.

Referring As can be seen from FIG. 1, a stator 1 (only part of which is illustrated), in particular a generator stator for a generator (which is not illustrated apart from this), which is used, for example, in order to generate electrical power in a power station, has a core 2 (which is likewise illustrated only partially) which is illustrated in FIG. 1 such that its longitudinal center axis runs essentially horizontally. In this case, the longitudinal center axis of the core 2 is not located on the surface of the drawing in FIG. 1, but, for illustrative purposes, is symbolized by a double-headed arrow 3, which runs parallel to the longitudinal center axis of the core 2 and thus represents the axial direction.

The core 2 has an axial end face 4 which in this case is in the form of a pressure plate 5 on the core 2. Two such pressure plates 5, which are arranged at the two axial ends of the core 2, can be used to brace metal-laminate segments, which are arranged between them, form the core 2, but are not shown here, with respect to one another in the axial direction. Away from the surface of the drawing, the core 2 contains a number of longitudinal slots on its inner circumference, in which winding bars 6 of a winding 7 are accommodated. The ends 8 of these winding bars 6 are passed out of the core 2 in the axial direction 3 on the end face 4 of the core 2 and are bent around radially outwards and in the circumferential direction of the stator 1, thus that at the ends 8 of the winding bars 6 form an involute profile. The ends 8 of the winding bars 6 are in this case curved and, in particular, connected to one another, such that they form an end winding 9, which widens in the form of a funnel or in the form of a cone as the distance from the core 2 increases.

In order that the winding 7 of the stator 1 can absorb the electrodynamic forces which occur during its operation, the winding 7 must be prestressed with relatively large forces in the axial direction 3. For this purpose, the end winding 9 must first of all be braced in the circumferential direction, in order to form a type of supporting buttress for introducing the axial forces into the axially extending winding bars 6. A supporting apparatus 10 according to the invention, and which has two or more winding supports 11, is used to produce this buttress-like bracing. In this case, these winding supports 11 are triangular or conical and are arranged distributed in the circumferential direction, in particular symmetrically, along the end face 4 of the core 2.

In the case of the embodiment shown here, at least the winding support 11 that is described here may be (but need not be) supported axially on the end face 4 of the core 2 or on the core via at least one axially acting compression spring device 12. All of the winding supports 11 of the supporting apparatus 10 may expediently be axially supported on the core 2 via two or more such compression spring devices 12. In this case, it may in fact be worthwhile not supporting the individual compression spring devices 12 directly on the winding supports 11, but supporting them on a supporting ring 13 which is close to the core and which is itself supported axially on the winding supports 11. The supporting ring 13 which is close to the core extends in the circumferential direction and is closed. The supporting ring 13 close to the core is expediently firmly connected to each winding support 11, for example by means of a screw connection 14. It is obvious that the circumferential distribution of the winding supports 11 along the supporting ring 13 close to the core need not be designed to be identical to the circumferential distribution of the compression spring devices 12 along the supporting ring 13 close to the core. In particular, the circumferential position of the winding supports 11 and of the compression spring devices 12 may differ from one another. In the same way, the number of compression spring devices 12 need not be the same as the number of winding supports 11.

However, it is important that, in principle, there is no need for such compression spring devices 12 for the supporting apparatus 10 according to the invention.

In order that the supporting apparatus and the winding supports 11 as well as the supporting ring 13 close to the core 13 may be axially at a distance from the core 2, the winding supports 11 and the supporting apparatus 10 must be fitted to or held on the core 2 such that it or they can be lifted off it in the axial direction 3. This link to the core 2 is in this case provided with the aid of at least one leaf spring 15, which is attached on the one hand to the winding support 11 and on the other hand to the core 2. One leaf spring 15 such as this is expediently fitted on each side of the winding support 11. The leaf springs 15 may pull the supporting apparatus 10 and/or the respective winding support 11 against the core 2 and/or—depending on the installation—may also draw it or them away from the core 2. By way of example, the leaf springs 15 are prestressed against the core 2 during assembly, so that they are ideally in a neutral state during operation. The leaf springs 15 also prevent displacement or tilting of the respective winding support 11 in the circumferential direction. In this case, the traction forces of the leaf springs 15 are relatively small.

The leaf spring 15 may, for example, have a first limb 16 which is attached to the winding support 11, as well as a second limb 17 which is attached to the end face of the core 2. The leaf spring 15 may be shaped between the link for the second limb 17 to the core 2 and the first limb 6 such that it produces the desired spring effect. By way of example, this particular section of the leaf spring 15 may have an Ω-shaped cross section.

The compression spring device 12 may, for example in the case of the embodiment described here, have a piston 18 which is driven in the axial direction 3 by a stack of plate springs 19.

Radially internally, the winding supports 11 are supported directly or indirectly on the end winding 9, to be precise in the direction 20 which runs essentially at right angles to an envelope surface 21 of the end winding 9. The support is thus essentially radial, but also has an axial component. At least the winding support 11 described here is supported indirectly on the end winding 9, to be precise via a stressing device 22. It is obvious that two or more of the winding supports 11, in particular all of them, are expediently supported on the end winding 9 via a respective stressing device 22 such as this. Furthermore, a coupling device 23 is formed between the end winding 9 and the winding support 11 described here. In this case as well, it is expedient for two or more of the winding supports 11, in particular all of them, to be associated with one such coupling device 23. The stressing device 22 and the coupling device 23 will be explained in more detail further below, with reference to FIG. 2.

As has already been explained further above, all of the winding supports 11 are connected to one another via the supporting ring 13 close to the core. Furthermore, the winding supports 11 are supported in the radially outward direction on the supporting ring 13 close to the core. For this purpose, appropriately shaped supporting surfaces 24 interact, which are formed in a suitable manner on the supporting ring 13 close to the core and on the respective winding support 11. The closed supporting ring 13 close to the core means that the winding supports 11 cannot move away radially outwards.

The embodiment described here also has a supporting ring 25 remote from the core, which likewise extends in the circumferential direction and is completely closed, and on which the winding supports 11 can likewise be supported on the outside in the radial direction. In a corresponding manner, suitable supporting surfaces 24 are once again formed between the winding supports 11 and the supporting ring 25 remote from the core. Furthermore, the supporting ring 25 remote from the core is also firmly connected to the winding supports 11, for example in each case via a suitable screw connection 26. The winding supports 11 are thus also supported radially on the outside at their end remote from the core.

Overall, the winding supports 11 and the supporting rings 13, 25 form a supporting case 27 which is extremely stiff in the radial direction and is supported on the end winding 9 in order to brace the winding 7 of the stator 1. This supporting cage 27 on the one hand produces an intensive radial compression load on the end winding 9, oriented at right angles to the envelope surface 21, so that this forms a supporting buttress, which can be loaded in tension in the axial direction. The axial and radial bracing of the end winding 9 is in this case achieved with the aid of the stressing device 22. It is particularly important in this case for the supporting cage 27 to be held such that it can move in the axial direction 3 relative to the core 2, specifically via the leaf springs 15. This allows the supporting cage 27 to follow axial movements of the end winding 9 which the latter carries out relative to the core 2, for example as a consequence of thermal expansion effects.

As is shown in FIG. 2, the stressing device 22 has a wedge 28 close to the core and a wedge 29 remote from the core. Both wedges 28, 29 are supported on a side facing the end winding 9 on a linear head rail 31 which extends parallel to an envelope line direction 30. In contrast, they are supported on a side facing the respective winding support 11 on a respective supporting rail 32 in the form of a ramp or wedge. The supporting rails 32 for the two wedges 28, 29, are in this case oriented such that they rise toward one another in the direction of the end winding 9. The wedges 28, 29 have sliding surfaces 33 which are complementary to the head rails 31 and to the supporting rails 32.

The stressing device 22 also has a tie rod 34, which is anchored firmly in the wedge 28 close to the core. A pressure sleeve 35 is plugged onto the tie rod 34 and is supported on the wedge 29 remote from the core, on a side facing away from the wedge 28 close to the core. A relatively large compression force acts on the pressure sleeve 35 at the end facing away from the wedge 29 remote from the core by means of a compression spring device 36 which in this case is formed by a stack of plate springs. The compression spring device 36 is supported on a nut 37 on its side facing away from the pressure sleeve 35, and the nut 37 is screwed onto the tie rod 34. The wedge 29 remote from the core and the pressure sleeve 35 are arranged such that they can move along the tie rod 34. The tie rod 34 extends parallel to the envelope line direction 30. The compression spring device 36 braces the two wedges 28, 29, thus driving the two wedges 28, 29 toward one another. This bracing which acts in the envelope line direction 30, is transmitted via the wedges 28, 29 to the winding supports 11 and in the process is converted into a compression force or supporting force acting at right angles to the envelope surface 21, by means of which the winding supports 11 are supported on the end winding 9 via the wedges 28, 29. The wedge effect can in this case result in the force being amplified to a relatively major extent, so that comparatively large supporting forces can be achieved with relatively physically small compression spring devices 36, by means of which the supporting cage 27 braces the end winding 9. The stressing device 22 may in this case compensate for thermal expansion effects or seating phenomena in the end winding 9 in that the wedges 28, 29 are driven by the compression spring device 36 so that they move toward one another when the distance between the end winding 9 and the respective winding support 11 increases and such that they move apart from one another, against the compression force from the compression spring device 36, when the distance between the end winding 9 and the associated winding support 11 decreases.

The coupling device 23 is now of major importance to the invention, and is designed such that it allows relative movements between the end winding 9 and the associated winding support 11 in the circumferential direction of the end winding 9 and at right angles to the envelope surface 21 of the end winding 9, while it prevents relative movements between the end winding 9 and the respective winding support 11 in the envelope line direction 30. In practice, it has been found that coupling such as this makes it possible on the one hand to prevent undesirable bracing between the individual winding supports 11 and the end winding 9 in the circumferential direction. On the other hand, the capability to move at right angles to the envelope surface 21 ensures that the stressing device 22 operates correctly. Furthermore, the positive coupling acting in the envelope line direction 30 between the end winding 9 and the winding support 11 results in the supporting cage 27 and the end winding 9 always being positioned in the same relative position with respect to one another, with reference to the axial direction 3. This makes it possible to ensure that the supporting cage 27 operates optimally and correctly. The coupling device 23 on the one hand makes it possible to ensure that the supporting cage 27 can follow the end winding 9 when it moves away from the core 2 as a result of thermal expansion of the winding 7 on the stator 1. On the other hand, the positive coupling by means of the coupling device 23 also ensures that the supporting cage 27 is moved back again when the end winding 9 moves back toward the core 2 as the winding 7 cools down. This configuration ensures that relative movements between the end winding 9 and core 2 of the stator 1 have no influence, or only a minor influence, on the bracing of the end winding 9.

In the case of the preferred embodiment described here, the coupling device 23 comprises a coupling body 38 as well as a recess 39. The recess 39 is formed on a lower face of the respective winding support 11, facing the end winding 9. The recess 39 has two guide surfaces 40, which bound the recess 39 in the envelope line direction 30, face one another and are planar. The planar guide surfaces 40 in this case extend parallel to one another, at right angles to the envelope surface 21, and in the circumferential direction.

The coupling body 38 is arranged in a fixed position relative to the end winding 9, projects from the end winding 9 at right angles to the envelope surface 21, and projects into the recess 39 in this direction 20. Within the recess 39, the coupling body 38 is supported via supporting zones 41 on the guide surfaces 40 in the envelope line direction 30. This results in an interlocking support between the coupling body 38 and the recess 39. Since the guide surfaces 40 are formed on the winding support 11, this results in an interlocking coupling between the winding support 11 and the end winding 9.

In the preferred embodiment described here, the coupling body 38 forms a separate component, which is anchored on the end winding 9. For this purpose, the end winding 9 has a component 42 which is firmly connected to the ends 8 of the winding bars 6. This component is expediently an outer bracing plate 42, which bounds the end winding 9 radially on the outside and which is normally braced by means of an inner bracing plate (which is not shown) and is arranged radially inwards on the end winding 9, with the outer and inner bracing plates clamping those ends of the winding bars 6 which are located in between them. A central bracing plate 54, which additionally stiffens the braced end winding 9, can expediently be arranged radially between the ends 8 of the winding bars 6.

The coupling body 38 is accordingly expediently attached to one of the outer bracing plates 42. An interlocking coupling 53, in particular a dovetail coupling, can be provided in order to anchor the coupling body 38 on the end winding 9, and in this case on the outer bracing plate 42. This configuration on the one hand allows particularly large forces to be transmitted.

On the other hand, this makes it easier to install the coupling body 38. Furthermore, an interlocking coupling 44 such as this, in particular by means of a dovetail coupling such as this, allows forces to be transmitted comparatively uniformly between the coupling body 38 and the end winding 9 or the bracing plate 42, thus making it possible to avoid stress peaks.

Although, in the case of the embodiment described here, the coupling body 38 is in the form of a separate or separable component, in another embodiment it may also in principle be permanently connected to the end winding 9 or to the bracing plate 42, for example, by means of a welded joint. It is likewise possible to form the coupling body 38 integrally on a corresponding component, for example the outer bracing plate 42, of the end winding 9.

In the embodiment described here, the supporting zones 41 are not formed directly on the coupling body 38 but in each case on a threaded bolt end 43 of a threaded bolt 44, with the respective threaded bolt 44 being screwed into a complementary threaded opening 45 which is formed in the coupling body 38. The threaded opening 45 is in this case oriented parallel to the envelope line direction 30. The threaded bolts 44 accordingly also extend in the envelope line direction 30. The threaded bolt ends 43 project out of the threaded opening 45 beyond the coupling body 38 at both of its ends, with respect to the envelope line direction 30. The supporting zones 41 are expediently in the form of planar surfaces, in order to reduce the load per unit area between the supporting zones 41 and the guide surfaces 40.

As an alternative to two individual threaded bolts 44, it is possible in another embodiment to provide one continuous threaded bolt 44 as well, which projects out of the threaded opening 45 at both ends 43 of the threaded bolt, and in each case has a supporting zone 41. The threaded opening 45 is in this case expediently in the form of a through-opening. Furthermore, it is also possible to design the coupling body 38 with more than one threaded opening 45, which are then fitted with one or with two threaded bolts 44 in a corresponding manner.

The threaded bolts 44 are provided at each of their threaded bolt ends 43 with an external polygonal shape 46, which allows a torque to be applied to the respective threaded bolt 44 by means of a suitable tool. The torque is in this case used to produce a screwing movement. Firstly, this makes it possible optimally adjust the relative position of the coupling body 38 within the recess 39. If two individual threaded bolts 44 are used, it is also possible to compensate for manufacturing tolerances. For example, the threaded bolts 44 are braced with a predetermined torque against the guide surfaces 40.

FIGS. 2 and 3 show a preferred embodiment of the coupling body 38 which is equipped with a through-opening 47. In the assembled state, this through-opening 47 extends parallel to the envelope line direction 30. The positions of the coupling body 38 and of the stressing device 22 are expediently now matched to one another such that the tie rod 34 passes through the coupling body 38 in the through-opening 47. The coupling body 38 is thus fixed in a captive manner on the end winding 9 when the stressing device 22 is installed.

Damping material 50 is now advantageously arranged radially between an outer face 48 of the tie rod 34 and an inner face 49 of the through-opening 47. In this case, this is designed such that the tie rod 34 is supported on the coupling body 38 via the damping material 50. This makes it possible to damp vibration and oscillations, which the tie rod 34 is subject to during operation of the stator 1. This improves the correct operation of the stressing device 22. A tube 51 is expediently inserted into the through-opening 47, which tube 51 is composed of the damping material 50, and through which the tie rod 34 is then passed. The tube 51 may expediently be attached to the inner face 49 of the through-opening 47, for example by overmolding, by surface welding or vulcanization. The damping material 50 is expediently in the form of a rubber or a plastic, in particular based on silicone. The other components which interact with one another, in particular the outer bracing plate 42, the coupling body 38, the threaded bolts 44 and the winding support 11, are expediently formed from a high tensile-strength steel, for example of the HGW type.

A gap 52 remains between the coupling body 38 and the recess 39 at right angles to the envelope surface 21, and is sufficiently large that there can be no direct contact between the winding support 11 and the coupling body 38 in this direction 20 as a result of any tolerable relative movements between the end winding 9 and the winding support 11.

The proposed interlocking coupling 53, that is to say in this case the dovetail coupling, is in this case aligned tangentially with respect to the envelope surface 21, so that the coupling body 38 can be plugged onto the outer bracing plate 42 in the direction of a tangent. For this purpose, the stressing device 22 is disassembled to a sufficient extent that the tie rod 34 can be removed. It is advantageous in this case that the stressing device 22 need not be removed completely in order to assemble and to disassemble the coupling device 23.

During the manufacture of the winding 7 of the stator 1, the insulation on the individual winding rods 6 is jointly polymerized. During this polymerization process, it is expedient even at this stage to brace the end winding 9 radially with the aid of the supporting cage 27. The individual winding bars 6 can then still move relative to one another during the polymerization process, thus dissipating any internal stresses. It is advantageous for the coupling device 23 to have not yet been activated during this polymerization process. For example, the coupling body 38 has not yet been installed during the polymerization of the winding 7. This allows relative movements in the envelope line direction 30 between the winding supports 11 and the end winding 9 for the polymerization process.

LIST OF REFERENCE SYMBOLS

1 Stator
2 Core
3 Axial direction
4 End face of 2
5 Pressure plate
6 Winding bar
7 Winding on 1
8 End of 6
9 End winding
10 Supporting apparatus
11 Winding support
12 Compression spring device
13 Supporting ring close to the core
14 Screw connection
15 Leaf spring
16 First limb of 15
17 Second limb of 15
18 Piston
19 Stack of plate springs
20 Direction at right angles to 21
21 Envelope surface of 9
22 Stressing device
23 Coupling device
24 Supporting surface
25 Supporting ring remote from the core
26 Screw connection
27 Supporting cage
28 Wedge close to the core
29 Wedge remote from the core
30 Envelope line direction
31 Head rail
32 Supporting rail
33 Sliding surface
34 Tie rod
35 Pressure sleeve
36 Compression spring device
37 Nut
38 Coupling body
39 Recess
40 Guide surface
41 Supporting zone
42 Component of 9/outer bracing plate
43 Threaded bolt end
44 Threaded bolt
45 Threaded opening
46 External polygonal shape
47 Through-opening
48 Outer face of 34
49 Inner face of 47
50 Damping material
51 Tube
52 Gap
53 Interlocking coupling/dovetail coupling
54 Bracing plate, central While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. An apparatus for supporting a winding on a stator, the stator including a core and at least one axial end face, the apparatus comprising:

a winding having two or more winding bars having ends which pass axially out of the stator core to form an end winding which widens in the form of a funnel on the at least one axial end face of the stator core;

two or more winding supports circumferentially distributedly arranged with respect to the end winding on said at least one axial end face and supported axially on said at least one axial end face and essentially at right angles to the end winding;

a stressing device, at least one of the winding supports being associated with the stressing device, the stressing device arranged between the end winding and said at least one winding support and producing a supporting force by which said at least one winding support is supported on the end winding via the stressing device;

a coupling device, at least one of the winding supports being associated with the coupling device, the coupling device allowing relative movements between the end winding and said associated at least one winding support in the circumferential direction of the end winding and at right angles to an envelope surface of the end winding, the coupling device inhibiting relative movements in an envelope line direction of the end winding.

2. The supporting apparatus as claimed in claim 1, wherein the coupling device includes a coupling body arranged firmly on the end winding, and a recess formed on the associated at least one winding support;

two mutually facing planar guide surfaces extending parallel to one another and in the circumferential direction, and at right angles to the envelope surface, the recess bounded in the envelope line direction by the two mutually facing planar guide surfaces;

the coupling body projecting at right angles to the envelope surface into the recess and supported by supporting zones in the envelope line direction on the guide surfaces.

3. The supporting apparatus as claimed in claim 2, wherein the coupling device includes at least one threaded bolt and the coupling body includes a threaded opening, the bolt screwed into the threaded opening which extends in the envelope line direction in the coupling body;

a threaded bolt end projecting out of the threaded opening, wherein one of the supporting zones is formed on said threaded bolt end.

4. The supporting apparatus as claimed in claim 3, wherein the threaded opening comprises a through opening; and further comprising a threaded bolt end projecting on each side of the threaded opening, one of the supporting zones being formed on each threaded bolt end.

5. The supporting apparatus as claimed in claim 4, further comprising:

two threaded bolts screwed into the threaded opening including threaded bolt ends projecting out of the threaded opening on opposite sides; or a single threaded bolt screwed into the threaded opening including threaded bolt ends projecting out of the threaded opening on opposite sides.

6. The supporting apparatus as claimed in claim 3, wherein, at a threaded bolt end which projects out of the threaded opening, each threaded bolt includes an external polygonal shape suitable for the introduction of a screwing torque.

7. The supporting apparatus as claimed in claim 2, wherein the end winding has at least one outer bracing plate and at least one inner bracing plate, between which ends of the winding bars are braced; and wherein the coupling body is fixed on one of the at least one outer bracing plate.

8. The supporting apparatus as claimed in claim 2, further comprising:

an interlocking coupling; and wherein the coupling body is attached to the end winding by the interlocking coupling.

9. The supporting apparatus as claimed in claim 8, wherein the interlocking coupling comprises a dovetail coupling.

10. The supporting apparatus as claimed in claim 2, wherein the stressing device includes a wedge positioned close to the core and a wedge positioned remote from the core, the wedges mounted on the end winding and on a respective winding support such that the wedges can move in the envelope line direction, and further comprising a tie rod that braces the wedges with respect to one another, the tie rod extending in the envelope line direction, the wedges driving a respective winding support and the end winding away from one another at right angles to the envelope surface;

wherein the coupling body includes a through-opening extending in the envelope line direction; and wherein the tie rod passes through the through-opening.

11. The supporting apparatus as claimed in claim 10, further comprising a damping material on an inner face of the through-opening; and wherein the tie rod includes an outer face supported by the damping material.

12. The supporting apparatus as claimed in claim 10, wherein the through-opening contains a tube composed of a damping material through which tube the tie rod extends.

13. The supporting apparatus as claimed in claim 1, further comprising:

at least one closed supporting ring extending in the circumferential direction; and wherein the winding supports are connected to one another and are supported radially on the outside by the at least one closed supporting ring.

14. The supporting apparatus as claimed in claim 1, further comprising:

means for holding the supporting apparatus in an axially elastic manner on the end face of the core.

15. The supporting apparatus as claimed in claim 1, wherein the stator comprises a generator stator in a power station.

* * * * *